United States Patent [19]

Ruip

[11] 4,353,403

[45] Oct. 12, 1982

[54] PNEUMATIC TIRE HAVING AIR ESCAPE MEANS

[75] Inventor: Terrence M. Ruip, Akron, Ohio

[73] Assignee: The Goodyear Tire & Rubber Company, Akron, Ohio

[21] Appl. No.: 219,393

[22] Filed: Dec. 22, 1980

Related U.S. Application Data

[63] Continuation of Ser. No. 853,685, Nov. 21, 1977, abandoned.

[51] Int. Cl.³ .................. B60C 15/02; B60C 5/16
[52] U.S. Cl. .................. 152/353 R; 152/362 R; 152/DIG. 9
[58] Field of Search ......... 152/362 R, 362 CS, 353 R, 152/353 C, 353 G, DIG. 9

[56] References Cited

U.S. PATENT DOCUMENTS

| 1,244,209 | 10/1917 | Hickman | 152/353 R |
| 1,915,963 | 6/1933 | Wait | 152/362 |
| 3,203,461 | 8/1965 | Enabnit | 152/362 R |
| 3,983,918 | 10/1976 | French | 152/353 R |
| 3,983,920 | 10/1976 | Gardner et al. | 152/362 R |
| 4,209,051 | 6/1980 | Udall | 152/362 R |

FOREIGN PATENT DOCUMENTS 2458923 6/1975 Fed. Rep. of Germany .

Primary Examiner—Edward C. Kimlin
Assistant Examiner—Lois E. Boland
Attorney, Agent, or Firm—Frank Pincelli

[57] ABSTRACT

A tubeless pneumatic tire having means in the lower bead portions of the tire for preventing the tire from being inflated when the tire is mounted on a wheel having a rim diameter smaller than for which it was designed.

3 Claims, 5 Drawing Figures

PNEUMATIC TIRE HAVING AIR ESCAPE MEANS

This is a continuation of application Ser. No. 853,685 filed Nov. 21, 1977, now abandoned.

BACKGROUND OF THE INVENTION

This invention relates to a pneumatic tire and, more particularly, to a tubeless pneumatic tire having means for preventing air retention when the tire is mounted on a wheel having a rim diameter smaller than that for which it was designed.

Pneumatic tire come in a variety of sizes and are generally designed to be used with a particular wheel size. When a tire is mounted and inflated on the size wheel for which it was designed, the bead portions of the tire engage the bead seats and rim flanges of the wheel in a secure manner, forming an airtight seal between the bead portion of the tire and the bead seat of the rim. Proper bead seating is essential in a tubeless-type tire from the standpoint of tire performance and safety of the occupants of a vehicle on which the tires are mounted.

With the large selection of tubeless tire and wheel sizes, there exists the possibility that a tire may be incorrectly mounted on a wheel having a rim diameter slightly smaller than that for which it was designed. Although the bead portions of the tire will not properly seal, inflation of the tire may occur due to the sealing engagement of the axial outer surface of the bead portions of the tire with the flanges of the rim. However, this type of sealing engagement is insecure and may lead to premature failure of the tire, thus, causing possibly injury to the occupants of the vehicle and/or damage to the tire itself. This type of mismounting is, of course, limited to wheels having a rim diameter smaller than that for which the tire was designed, but large enough to permit sealing between the rim flange and side of the bead portion of the tire.

SUMMARY OF THE PRESENT INVENTION

A tire made in accordance with the present invention is provided with means in the lower exterior bead portion of the tire for preventing the tire from being inflated when the tire is mounted on a wheel having a rim diameter smaller than that for which it was designed to be used with. The tire is provided with a plurality of radially extending projections or depressions placed circumferentially about the tire which extend from the lower bead portion of the tire radially outward along the sidewall portion of the tire.

DESCRIPTION OF THE PREFERRED EMBODIMENT

Figure 1:
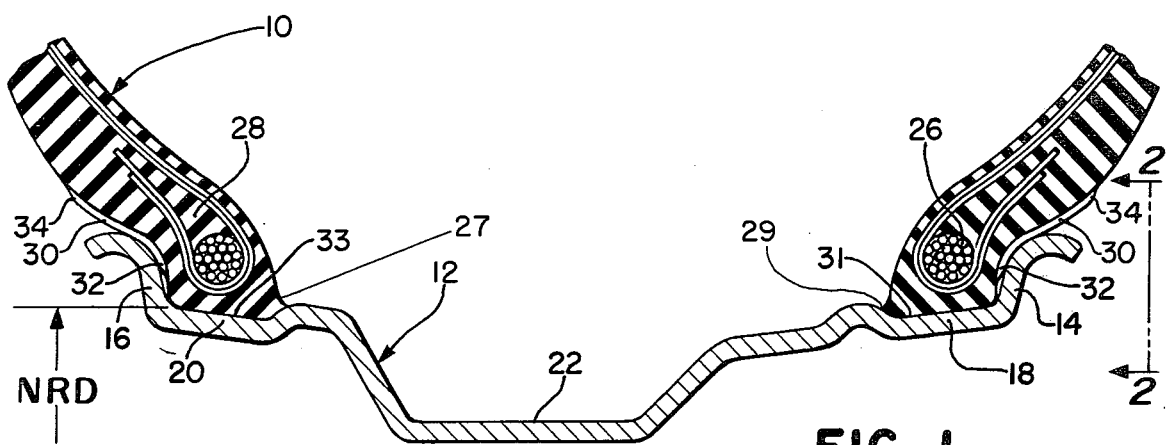
FIG. 1 is a fragmentary transverse sectional view showing the preferred embodiment of the invention mounted on a wheel having the correct rim diameter size for which it was designed.

Referring to FIG. 1, there is illustrated a tire 10 made in accordance with the present invention mounted on a wheel having rim 12 for which it was designed. The rim 12 comprises a pair of axially spaced flanges 14, 16 which extend annularly around the wheel. The radially inner ends of the flanges 14, 16 merge into a pair of bead seats 18, 20, respectively. The rim 12 further comprises an annular wheel portion 22 spaced axially inwardly from the bead seats 18, 20.

The tire 10 is provided with bead portions 26, 28 such that when the tire is mounted on a wheel 12 for which it was designed, the bead portions 26, 28 are in butting relationship with flanges 14, 16, respectively, the toe portions 27, 29 of the tire 10 forming an airtight sealing relationship with bead seats 18, 20, respectively. The tire 10 is of the tubeless type and may be of a radial or bias ply constructions.

The exterior surface of bead portions 26, 28 is provided with a plurality of radially extending projections or depressions which extend from the lower portion of bead portions 26, 28 radially outward along the exterior sidewall surface of tire 10. Referring to FIGS. 1 through 4, the preferred embodiment of the present invention is provided with a plurality of ribs 30. The radially inner end 32 of ribs 30 start at a point on bead portions 26, 28 such that the tire 10 when mounted on a wheel having a rim diameter smaller than that for which it was designed (as shown in FIG. 4) will prevent inflation of the tire. In particular, the present invention is designed to prevent inflation of a tire on a rim diameter which is approximately ¼ of an inch (6.248 mm) to ¾ of an inch (19.05 mm) less in diameter than that for which the tire was designed to be used with. The ribs 30 should not extend radially inward as to interfere with proper bead seating and sealing of the tire on the rim for which it was designed (as illustrated in FIG. 1). Preferably, the ribs 30 do not extend radially inward of the bead heel sharp point. In this connection the ribs or projections and grooves or depressions start from a point spaced radially outward of the nominal rim diameter of said tire.

The radially outer end 34 of ribs 30 may extend to any point desired along the exterior surface of the tire. The end 34 should extend radially outward a distance so that the ribs will prevent the exterior surface of the lower bead portion of the tire from sealing with the rim flanges of the rim. The exterior surface of the tire 10 in between the ribs 30 should be free of any substantially circumferentially extending projection or projections.

The number of projections or depressions necessary will vary upon the size of the tire and the cross-sectional configuration and size of the projections or depressions. There should be a sufficient number of projections or depressions to prevent the bead portions 26, 28 from forming a sealing engagement with flanges 14, 16.

Figure 2:
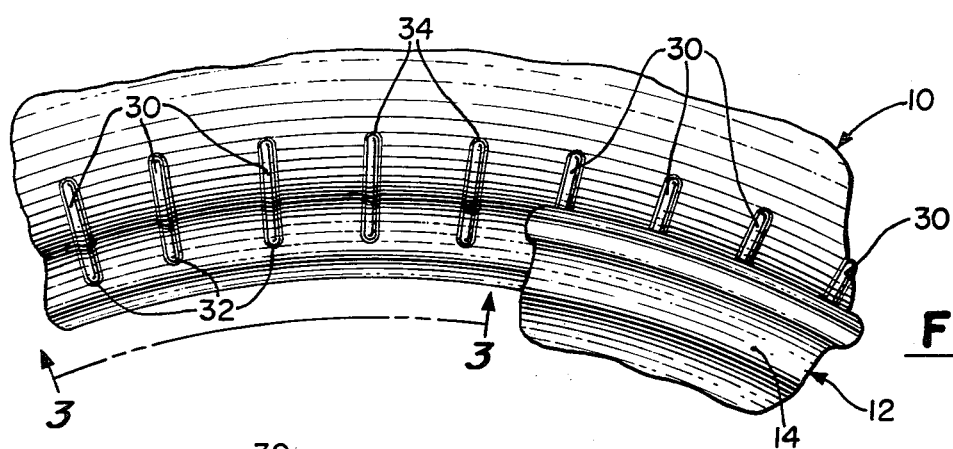
FIG. 2 is a fragmentary side view of a tire made in accordance with the present invention taken along line 2—2 of FIG. 1.
Figure 3:
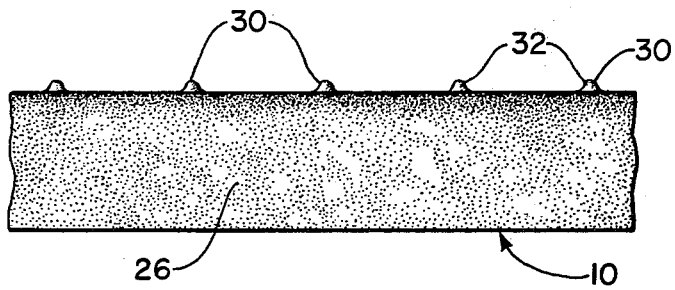
FIG. 3 is a cross-sectional view of a tire made in accordance with the present invention taken along line 3—3 of FIG. 2.
Figure 4:
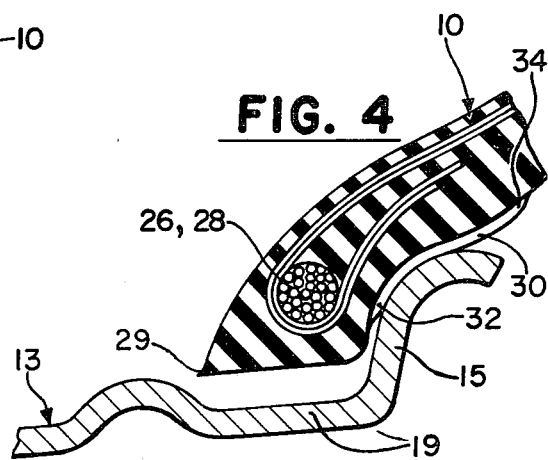
FIG. 4 is a fragmentary, transverse sectional view of a tire according to the preferred embodiment of the present invention mounted on a wheel having a rim diameter smaller than that for which it was designed.

In the particular tire illustrated in FIGS. 1 through 3, the ribs 30 are circumferentially spaced approximately an inch apart, are semi-circular in cross-sectional configuration and extend from a point spaced radially outward from the nominal rim diameter NRD of the tire a distance equal to approximately 0.5 inches (12.7 mm) and radially outward along the exterior surface of the tire 10 a distance equal to about 0.5 inches (12.7 mm). The ribs 30 have a width W, and a height H, equal to approximately 0.030 inches (0.762 mm). Various other sizes and configurations may be used so long as they do not interfere with proper bead seating.

The tire bead toe surfaces 31, 33 when in the mold in which it is cured form an angle from about 10° to 20°, preferably 15° with a line parallel to the rotational axis of the tire 10.

The bead seats 18, 20 of wheel 12 for which the tire 10 was designed are inclined outwardly and typically have an angle of a few degrees, that is, from about 2° to 10°, preferably about 5°, as measured between a plane parallel to the rotational axis of the tire 10 and passing along the surface of the bead seats.

Referring to FIG. 4, there is illustrated a tire 10 made in accordance with the present invention mounted on a wheel 13 having a rim diameter less than the rim for which it was designed.

For the purpose of clarity, only one half of the wheel 13 is illustrated, the other half not shown being identical to the axial end shown. It should therefore be understood all that is said with respect to the half illustrated applies equally to the half not shown. The flange 15 extends angularly around the wheel 13, the radially inner end merging into a bead seat 19. The radial height of flange 15 of wheel 13 is such that the radially outermost point extends radially outwardly from the axis of the wheel 13 a distance equal to about the distance in which the radially outermost point of flanges 14, 16 of wheel 12 extend from its respective axis.

Ribs 30 prevent the bead portions 26, 28 of the tire 10 from forming a sealing engagement with flange 15 of the wheel 13 by allowing air to escape from the internal cavity of the tire 10 outward along the exterior part of tire 10 to the atmosphere, as is indicated by the arrows in FIG. 4.

Figure 5:
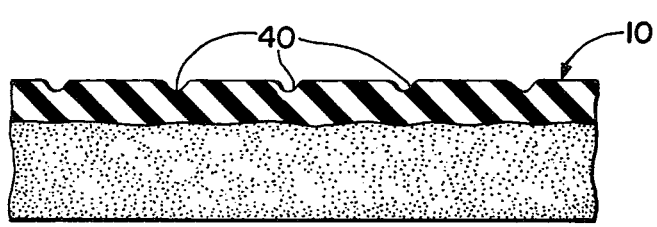
FIG. 5 is a fragmentary cross-sectional view similar to that of FIG. 3 illustrating a modified form of the present invention.

Referring to FIG. 5, there is illustrated an alternate embodiment of the present invention. In place of the ribs 30 shown in FIG. 3, grooves 40 are provided in the lower bead portion to prevent the tire from forming a sealing engagement with flange 15. The grooves 40 start from the same lower limits as ribs 30 and extend radially outward along the surface of the tire 10 terminating in the same manner as ribs 30. The grooves 40 have the same width W and height H as ribs 30.

While certain representative embodiments and details have been shown for the purpose of illustrating the invention, it will be apparent to those skilled in this art that various changes and modifications may be made therein without departing from the spirit or scope of the invention.

I claim:

1. A tubeless pneumatic tire comprising a pair of bead portions, means on each bead portion providing airtight sealing relation with a bead seat of a first rim having a first rim diameter on which the tire is designed to be mounted and inflated for use, said means comprising a bead toe surface on each bead portion which when in the mold in which the tire is cured forms an angle with a line parallel to the rotational axis of the tire, and additional means on at least one bead portion for preventing inflating of said tire when it is mounted on a second rim having a second rim diameter which is about one-quarter to three-quarters of an inch less than the first rim diameter of the first rim, said additional means comprising projections on the exterior surface of said one bead portion forming an air escape between said one bead portion and a flange of the second rim, said projections being spaced apart circumferentially about the tire rotational axis and starting from a point spaced radially outward of the nominal rim diameter of said tire, the exterior surface of the tire in between said projections being free of any projections extending circumferentially of the tire.

2. A pneumatic tire as claimed in claim 1 in which said projections have a height and width of about 0.030 inches.

3. A pneumatic tire as claimed in claim 1 in which said projections have a height and width of about 0.030 inches and have a length of about 0.5 inches and extend generally radially outwardly of the tire rotational axis along said exterior surface of said one bead portion.

* * * * *

UNITED STATES PATENT AND TRADEMARK OFFICE
CERTIFICATE OF CORRECTION

PATENT NO. : 4,353,403
DATED : October 12, 1982
INVENTOR(S) : Terrence M. Ruip

It is certified that error appears in the above-identified patent and that said Letters Patent are hereby corrected as shown below:

Column 1, line 13 should be "tires" instead of tire;
Column 3, line 17 should be "annularly" not angularly.

Signed and Sealed this

Twelfth Day of June 1984

[SEAL]

Attest:

GERALD J. MOSSINGHOFF

Attesting Officer        Commissioner of Patents and Trademarks